United States Patent [19]

De Bruine

[11] 4,307,791
[45] Dec. 29, 1981

[54] LINE FOLLOWER VEHICLE WITH SCANNING HEAD

[75] Inventor: Carl De Bruine, Grand Rapids, Mich.

[73] Assignee: Bell & Howell Company, Chicago, Ill.

[21] Appl. No.: 966,885

[22] Filed: Dec. 6, 1978

[51] Int. Cl.² .................................................. B62D 1/24
[52] U.S. Cl. .................................. 180/168; 250/202; 318/577
[58] Field of Search ................ 318/577, 587; 250/202; 180/167–169

[56] References Cited

U.S. PATENT DOCUMENTS

| | | | |
|---|---|---|---|
| 2,317,400 | 4/1943 | Paulus et al. | 180/79.1 |
| 3,147,817 | 9/1964 | De Liban | 180/82 |
| 3,411,603 | 11/1968 | Kohls | 180/168 |
| 3,628,624 | 12/1971 | Wesenet | 180/168 |
| 3,718,821 | 2/1973 | Vischulis | 250/202 |
| 3,738,443 | 6/1973 | Kubo | 180/168 |
| 3,881,568 | 5/1975 | Ando et al. | 180/168 |
| 3,935,922 | 2/1976 | Cooper et al. | 180/168 |
| 4,003,445 | 1/1977 | De Bruine | 250/202 |
| 4,077,488 | 3/1978 | Bennett et al. | 180/169 |
| 4,121,096 | 10/1978 | Merezhki | 250/202 |

Primary Examiner—H. Grant Skaggs
Attorney, Agent, or Firm—John E. McGarry; Thomas L. Lockhart

[57] ABSTRACT

An automatically guided vehicle wherein a guide line is positioned in a predetermined path on the floor and the vehicle has a sensing head positioned over the guide line to detect the position of the guide line with respect to the vehicle and to generate an error signal representative of the vehicle position with respect to the guide line. A control circuit is also provided on the vehicle to steer the vehicle responsive to the error signal generated by the sensing head. The sensing head includes a scanning head to scan across the guide line and to generate an output signal representative of the detected light values at discreet positions of the scan. The control circuit is adapted to steer the vehicle along the right edge, left edge or center of the guide line and is responsive to control codes positioned on the floor adjacent the guide line. The control circuit preferably includes a microprocessor which is programmed to compensate the output signals for any nonlinearity of the light source, variations in scan distance from the scanning head to the floor surface and for any variations in the port size of the light-detecting device on the vehicle. The microprocessor includes a data storage bank for storing a data table relating to the position of the vehicle with respect to the guide line and has the ability to compare the data table for one scan with the data table of subsequent scans to determine the presence of a valid guide line and to update the position of the guide line with respect to the vehicle.

13 Claims, 17 Drawing Figures

LINE FOLLOWER VEHICLE WITH SCANNING HEAD

BACKGROUND OF THE INVENTION

1. Field of the Invention

This invention relates to automatically controlled vehicles. In one of its aspects, the invention relates to an automatically controlled vehicle which has the ability to process coded information and to guide the vehicle responsive hereto.

2. State of the Prior Art

In commonly assigned U.S. Pat. No. 3,935,922 issued Feb. 3, 1976, there is disclosed and claimed a vehicle guidance system for guiding a vehicle along a predetermined invisible guide line containing fluorescent material. The guidance system includes a sensing head having three photocells to detect the position of the guide line with respect to the vehicle. The photocells are focused on an area of the floor directly beneath the sensing head and gathered light from that area as a whole is used to guide the vehicle along the guide line. The "area" sensing technique makes it difficult to control the vehicle along branch lines without extensive electrical and/or optical alterations. Further, this prior technique makes it difficult for the vehicle to distinguish between one of two or more adjacent guide lines within the sensor's field of view. Still further, the ability to read, store and execute a large number of coded instructions is difficult with conventional electronics.

Automatically guided vehicles which can be programmed to follow a predetermined course reponsive to coded instructions in the floor are known. For example, the DeLiban U.S. Pat. No. 3,147,817 (issued Sept. 8, 1964) and Paulus et al U.S. Pat. No. 2,317,400 (issued Apr. 27, 1943) and Kohls 3,411,603 (issued Nov. 19, 1968). Each of these systems, however, uses buried wires and does not use reflected or simulated emission light.

Automatically guided vehicles which use reflected light and photocells to detect the position of a reflected light guide line are disclosed in the U.S. patents to Vischulius Nos. 3,718,821 (issued Feb. 27, 1973); Kubo 3,738,433 (issued June 12, 1973); Ando et al 3,881,561 (issued May 6, 1975); and Wesener 3,628,624 (issued Dec. 21, 1971).

SUMMARY OF THE INVENTION

According to the invention there is provided a system for automatically guiding a vehicle wherein a guide line is positioned in a predetermined path on the floor and the vehicle has means to sense the position of the guide line with respect to the vehicle and for generating an intelligence signal representative of the vehicle position with respect to the guide line. The vehicle further comprises a control means to steer the vehicle responsive to the intelligence signal generated by the sensor means so as to maintain the vehicle in a predetermined lateral position with respect to the guideline as the vehicle moves therealong. The sensor means includes means to scan across the guide line and for generating an output signal representative of the detected light values at discreet positions along the floor beneath the vehicle. Means coupled to the scanning means detect the position of the vehicle with respect to the guide line based on the output signals therefrom.

The control means intelligence signal is preferably representative of the position of the vehicle with respect to the left or right edge of the guide line.

The guide line preferably comprises a fluorescent material which is invisible under ordinary lighting conditions and the vehicle has a means for exciting the fluorescent guide line.

The sensing means is adapted to correct the intelligence signal for measurable deviations from a correct output signal. For example, the background radiation is electronically filtered from the output signals. Also, the output signals are modified to compensate for any non-linearity of the light source which is carried by the vehicle for illuminating a floor surface beneath the sensing head. Further, the output signals are modified to compensate for the variation in the scan distance from the scanning head to a floor surface beneath the vehicle and for any nonlinearity of the light source due to the limited size of the opening through which the detector views the floor surface.

The intelligence signal generating means preferably comprises a microprocessor including data storage means and means for storing a first data table relating to the position of the vehicle with respect to the guide line for a first scan, a means for comparing a second data table for a subsequent scan of the scanning head with the first data table and means for updating the data table stored in the storage means with the second data table in the event that the guide line positioned in a second data table is within a predetermined relationship to the guide line positioned in the first data table. The microprocessor further has means for detecting the left and right edge of the guide line with respect to the vehicle and means for stopping the vehicle in the event that any guide line found in the data table when a predetermined number of consecutive scans is not within a predetermined relationship to the guide line position of the first data table.

The invention further includes the use of code marks, for example, as spurs at right angles to the guide line, means in the microprocessor for detecting the presence of the code mark, and means for guiding the vehicle based on the detected code marks.

BRIEF DESCRIPTION OF THE DRAWINGS

The invention will now be described with reference to the accompanying drawings in which.

DESCRIPTION OF THE PREFERRED EMBODIMENT

Figure 1:
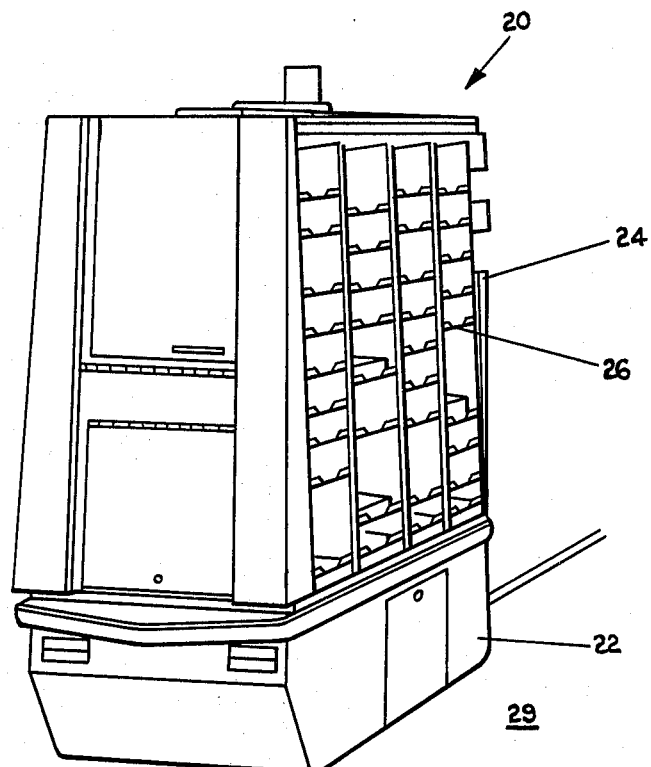
FIG. 1 is a perspective view of an automatically controlled vehicle according to the invention.

Referring to the drawings and to FIG. 1 in particular, there is shown an automatically controlled guided vehicle 20 having a base 22 and an upper cabinet 24. A plurality of mail shelves 26 are provided in the cabinet 24 to receive mail or other similar articles. A guide line 28 is provided on the floor 29 on which the vehicle runs. The guide line 28 can be any suitable detectable material such as photosensitive tape or fluorescent material. Preferably the system used is the fluorescent guide line system which is disclosed and claimed in the Cooper et al U.S. Pat. No. 3,935,922.

Figure 2:
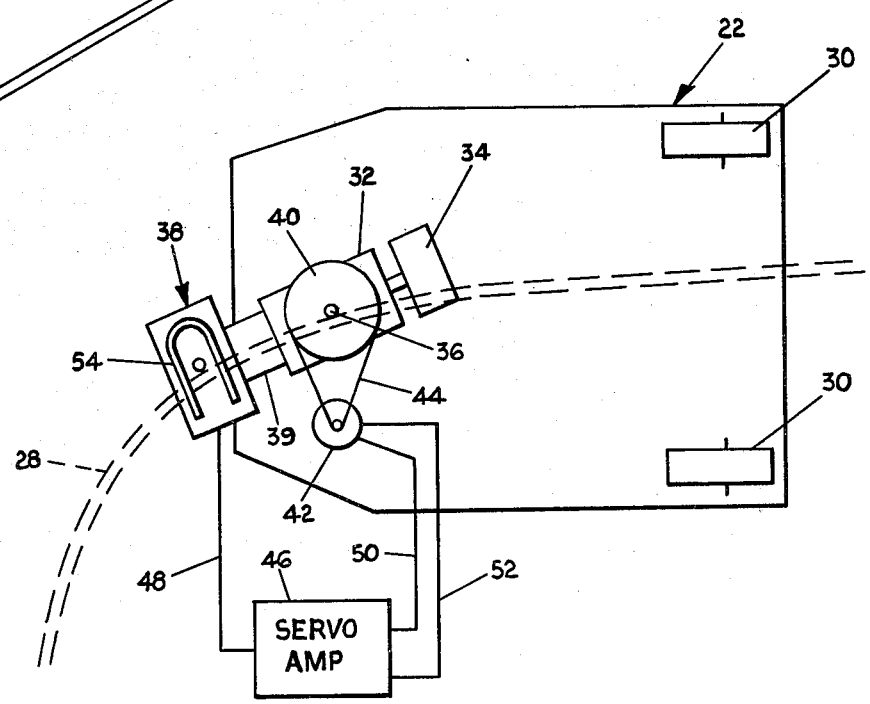
FIG. 2 is a schematic block diagram of a plan view of the vehicle shown in FIG. 1 illustrating the servomechanism for the drive wheel.

Referring now to FIG. 2, the vehicle base 22 has rear wheels 30 and a front traction, steerable wheel 32. A drive motor 34 is connected to the wheel 32 in conventional fashion, for example, a chain (not shown), to drive the wheel 32. The steerable wheel 32 is mounted on a pivot pin 36 about which the wheel is free to rotate. A sensing head 38 is mounted to the pivotable mounting mechanism for the wheel 32 through a suitable frame 39. Thus, the sensing head 38 is pivotably movable along with the wheel 32 so that if the unit is maintained over the center of the guide line 28, the wheel 32 is continuously placed in a direction such that the vehicle will follow the guide line 28. The sensing head 38 incorporates a U-shaped ultraviolet tube 54 to illuminate the surface beneath the sensing head 38. A sprocket 40 is mounted on the pivot pin 36 for the steerable wheel 32 and is connected to a reversible steering motor 42 through a drive chain 44. A servoamplifier 46 is connected to the sensing head 38 through lead 48 and has output leads 50 and 52 connected to the steering motor 42.

In operation, the sensing head 38 detects the position of the sensing head with respect to the guide line 28, generates an intelligence signal with a polarity related to any lateral deviation of the sensing head 38 from the guide line 28 and applies the intelligence signal to the servoamp 46. The guide line is illuminated and excited by the U-shaped ultraviolet tube 54. An output from the servoamplifier circuit 46 is applied to the steering motor 42 through lead 48 to rotate the wheel either clockwise or counterclockwise, depending on the deviation of the sensing head 38 from the guide line 28. To this end, the motor rotates the sprocket 40 through chain 44 to thereby rotate the wheel 32 about the pivot pin 36.

Figure 3:
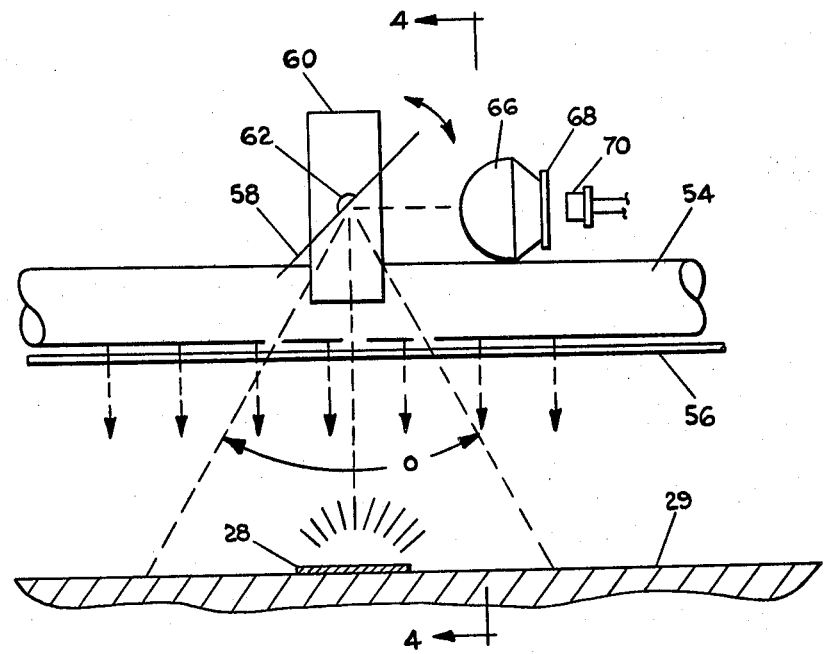
FIG. 3 is a schematic front elevational view of a line-detecting scanning system according to the invention.
Figure 4:
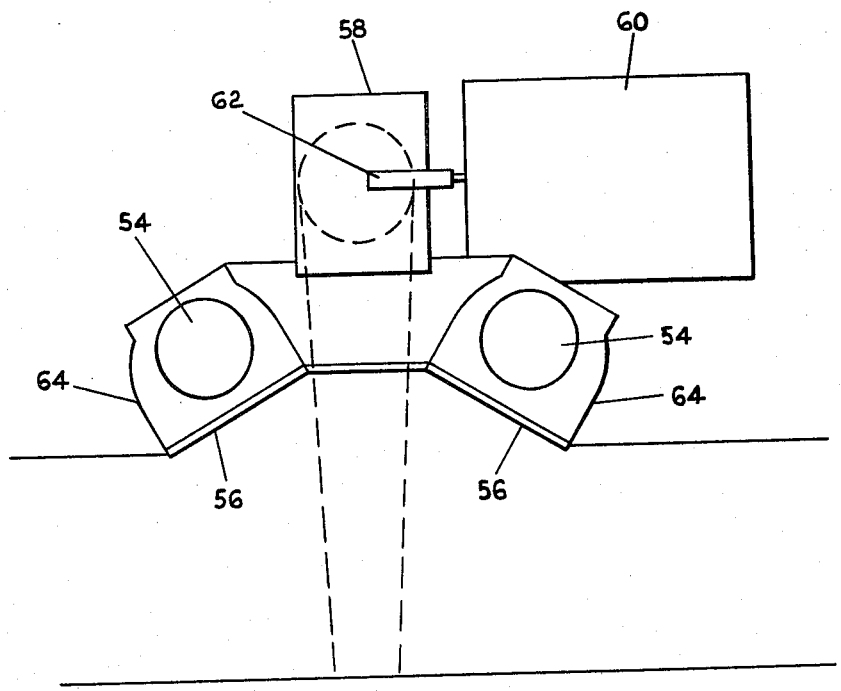
FIG. 4 is a side elevational view seen along lines 4—4 of FIG. 3.

Reference is now made to FIGS. 3 and 4 for a description of the sensing head 38. The ultraviolet tube 54 is enclosed within a reflector housing 64 and has optical filters 56 positioned therebeneath. The filters 56 filter out visible light and permit ultraviolet light to pass therethrough. A scanning mirror 58 is mounted on a scanning motor 60 through a mirror mounting bracket 62. The motor 60 is a reversing motor and is controlled through means which will be described later to oscillate the mirror 58 about the bracket 62 through an angle of about 20° at a rate of 56 cycles per second. A lens 66 is mounted to receive reflections from a mirror 58 and focus the reflections from the floor 29 onto a photodiode 70. Optical filter 68 is positioned between the photodiode 70 and the lens 66 to filter out light other than the frequency of the guide line 28. Thus, as the scanning mirror oscillates back and forth, the photodiode is focused on the floor and sweeps across the guide line through an angle phi ($\phi$) at 61 cycles per second. Preferably, the system is set so that the diode sweeps a 4" section of the floor surface. The optical system is such that the size of the area viewed by the photodiode at any instant of time is approximately $\frac{1}{2}$" in diameter.

Figure 5:
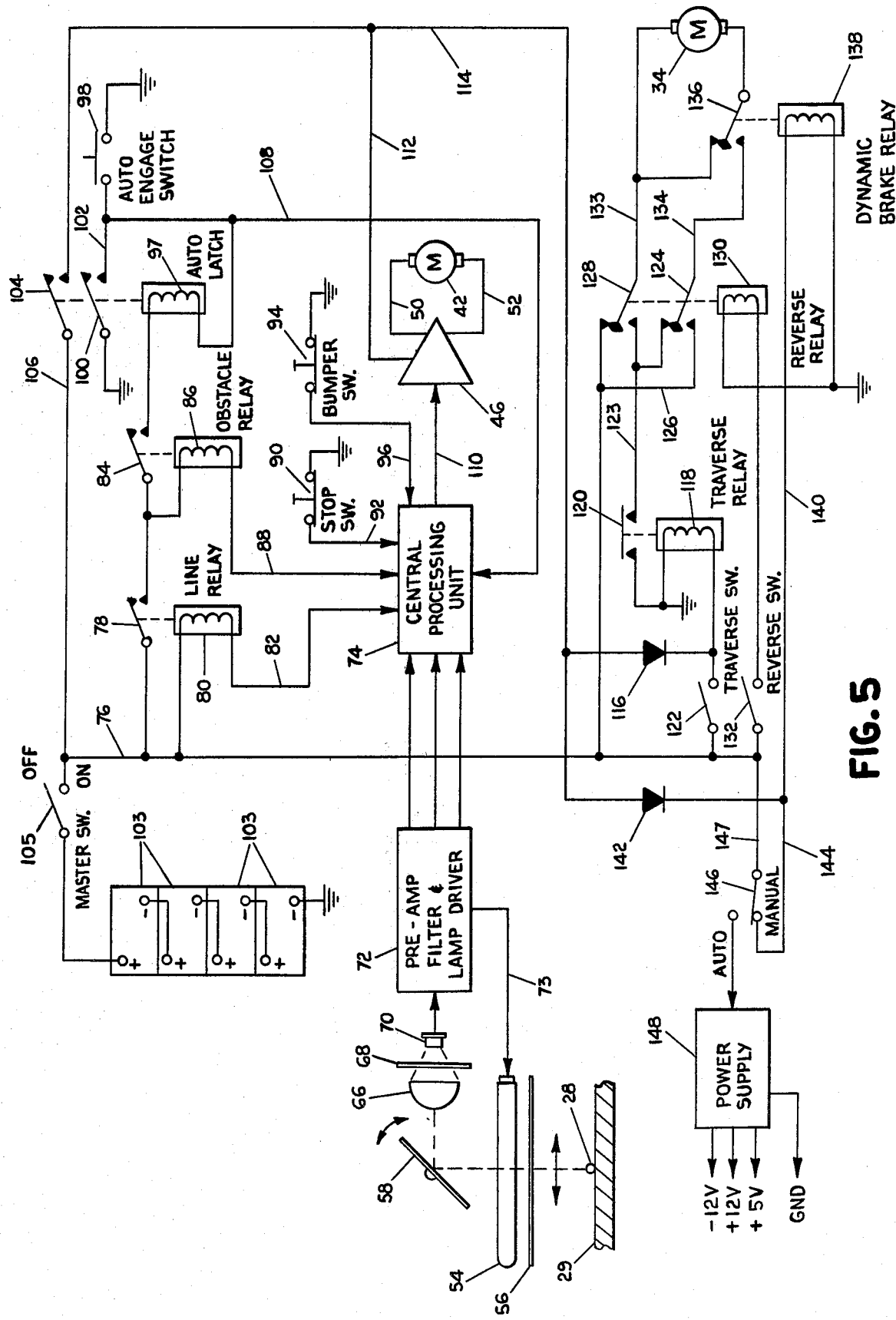
FIG. 5 is a schematic diagram of the electrical control circuit according to the invention.

Reference is now made to FIG. 5 for a description of the vehicle control circuitry, where like numerals are used to designate like elements. The output from the photodiode 70 is applied to a preamplifier filter and lamp driver 72 which drives the ultraviolet tube at 4 KHz. Although the ultraviolet tube is excited at 4 KHz, the light produced by the guide line 28 occurs at 8 KHz because the light produced by the ultraviolet tube has no polarity. In other words, the fluorescent (or reflected light) from the guide line 28 occurs at every half cycle of the 4 KHZ excitation.

The preamplifier 72 amplifies, filters and samples the output signal from the photodiode 70 and generates a scan output signal which is applied to the central processing unit 74. The preamplifier filter and lamp driver circuit 72 also drive the scanning motor 60 at 56 Hz and generate a pulse each time the scan and retrace are completed. Further, the preamplifier filter and lamp driver circuit 72 generate sync pulses at 56 Hz which are applied to the central processing unit 74.

The central processing unit 74 uses the sample-and-hold signal from circuit 72 to determine the center line position of the guide line 28 with respect to the sensing head 38. The central processing unit 74 can also use the sample-and-hold signal from the circuit 72 to determine the right and left edge positions of the guide line with respect to the vehicle. It then generates a displacement error signal which is applied to the servo-power amp 46 through lead 110. The power-servo amp, as previously described, drives the steering motor 42 through leads 50 and 52 in order to position the sensing head 38 centrally over the guide line 28.

The central processing unit 74 further utilizes the sample-and-hold signal to detect the presence of code signals on the floor to cause the vehicle to branch left or right when a "Y" in the guide line is encountered. To this end, the central processing unit is programmed to respond to coded instructions on the guide path to follow the left branch or the right branch of the "Y". Alternately, an external stimuli, for example a switch on the vehicle, can be used to instruct the central processing unit to branch left or right at a given location. In any case, the central processing unit has the ability to control the position of the sensing head 38 so that it follows the left or right edge of the guide line.

The central processing unit further has the ability to determine the presence of a valid guide line and the presence of valid code marks on the floor. Thus, if a guide line is not present beneath the vehicle, the vehicle is stopped and turned off.

Power is supplied to the control circuit from a series of DC batteries 103 to lead 106 through an on-off master switch 105. Specifically, 24 volts of power are supplied to the entire system. A series of controls are built into the vehicle to prevent operation of the vehicle if a valid guide line does not exist, or to stop the vehicle in the event that the vehicle strikes an obstacle or is otherwise stopped by safety switches. Accordingly, the central processing unit receives inputs from leads 82, 88, 92, 96 and 108. Lead 82 is connected to the 24-volt line 76 through line relay 80 which is energized to close switch 78 by the central processing unit 74 if it determines a valid guide line exists. Lead 88 is connected between the central processing unit 74 and the 24-volt line through obstacle relay 86 and line relay switch 78. The central processing unit 74 checks to see if switches 92 and 94 are closed, and, if so, energizes the relay 86 to close switch 84. Lead 92 is connected to a ground through stop switch 90 which is a manual switch on the vehicle. Lead 96 is grounded through bumper switch 94. Lead 108 is connected between the central processing unit 74 and the 24-volt line through autoengage and latch relay 97, obstacle relay switch 84 and line relay switch 78. Lead 108 is further connected to a ground through autoengage switch 98. The relay 97 operates double ganged switches 100 and 104. Switch 100 connects lead 108 to ground through lead 102. Switch 104 connects a 24-volt line 106 to lead 114. Thus, when the autoengage switch 98 is actuated manually, it grounds lead 108 to the central processing unit 74 which, in turn, energizes relays 80 and 86 to energize relay 97. Upon closing of switch 100, the relay 97 is latched and switch 104 remains closed until the central processing unit 74 de-energizes relay 86 (as a result of striking an obstacle, or opening stop switch 90) or relay 80 (if no valid guide line is present).

The power to drive the driver motor 34 is provided by lead 114 through a circuit which permits reversing of polarity. This circuit includes a diode 116 which is connected to traverse relay 118 and switch 120. A double-gang reversing switch comprising switch members 124 and 128 is connected to the traverse-relay switch 120 through lead 123 which form the central contacts of the switch. The other contacts for the double-throw switch are provided in a 24-volt line 126. A reversing switch relay 130 has power supplied thereto through 24-volt line 76 and a switch 132. Output leads 133 and 134 from the double-throw switch are applied to the drive motor 34 through a dynamic brake relay switch 136 operated by a dynamic brake relay 138. Power is supplied to the dynamic brake relay 138 through lead 140, diode 142 and lead 114. Reversal of the polarity of the motor is accomplished by closing switch 132 which energizes relay 130.

A mode selector switch 146 provides a means for operating the vehicle automatically or manually. The switch 146 is a manual switch on the vehicle and connects the power supply 148 to the 24-volt line 76 through lead 147 in the automatic mode and to lead 144 in the manual position. The power supply 148 is connected to the central processing unit 74 to supply power thereto.

In operation of the system illustrated in FIG. 5, switch 105 is manually pressed to deliver 24 volts of power to line 106 and to line 76. Further, mode selector switch 146 must be moved from the manual switch position illustrated in FIG. 5 to the automatic terminal, thereby delivering 24 volts of power to power supply 148 which in turn is connected to the electronics, including the central processing unit 74. Upon determination of a valid guide line by the central processing unit 74 (as will be described later), current is applied from the central processing unit through line relay 80 to close the line switch 78. The central processing unit 74 checks to see whether bumper switch 94 is closed and, if so, delivers a signal to the obstacle relay 86, thereby closing obstacle switch 84 and applying current to the autoengage and latch relay coil 97. Upon pressing the autoengage button 98, the current flows through the relay coil 97, thereby closing switches 104 and 100. Thereafter, release of the autoengage button 98 will continue to latch the switches 100 and 104 so that current flows through lead 108 to the central processing unit 74 and through switch 104, through lead 112 to the servo-power amp 46.

In order to apply voltage to the drive motor 34, current passes through diode 116, from lead 114, to traverse relay 118 thereby closing traction switch 120 and grounding lead 134 through switch 124 and lead 123. At the same time, current passes through diode 142, lead 140 through the dynamic brake relay 138 to close switch 136, thereby completing the circuit from the motor to lead 134.

To operate the vehicle manually, mode selector switch 146 must be moved to the manual position illustrated in FIG. 5, thereby delivering 24 volts through leads 144 and 140 to dynamic brake relay 138 to close switch 136. The circuit for drive motor 34 is completed through lead 134, switch 124, lead 123 and traction switch 120, when traction switch 122 is manually closed.

In order to reverse the direction of the motor, reverse switch 132 is thrown, thereby exciting relay 130 and throwing the double ganged switches 124 and 128, thereby reversing the polarity of the voltage to the drive motor 34.

Figure 6:
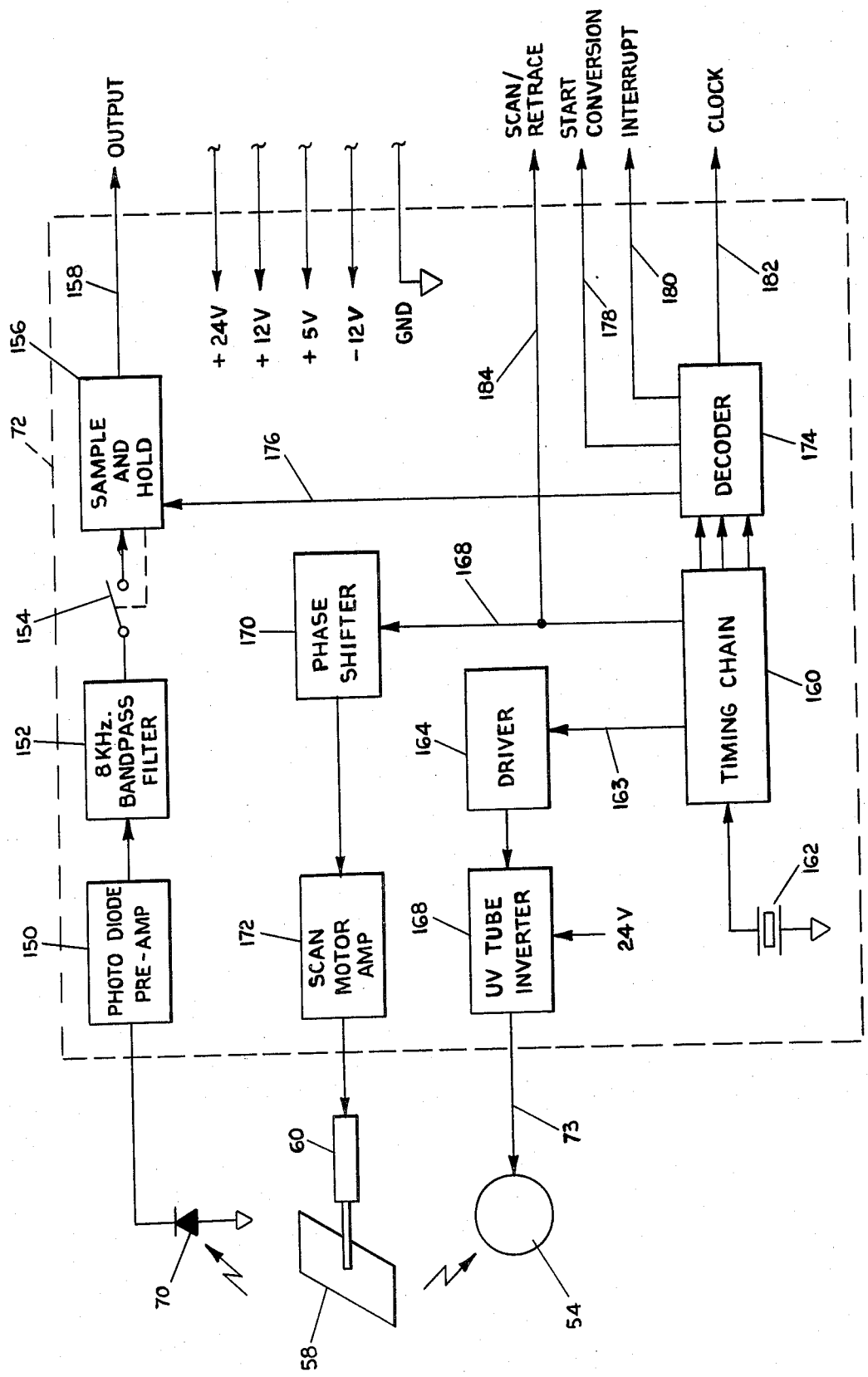
FIG. 6 is a schematic diagram of the scanning head electronics shown in block form in FIG. 5.

Reference is now made to FIG. 6 for a more complete description of the functions of the preamp filter and lamp driver circuit 72. As illustrated, the photodiode 70 is connected to a photodiode preamp 150 which amplifies the output from the photodiode and generates an enhanced signal which is applied to a band pass filter 152 to filter frequencies other than 8 KHz frequencies from the signal. The filter output is applied to a sample-and-hold circuit 156 through a switch 154. The sample-and-hold circuit generates an output signal at 158 responsive to synchronization pulses applied through line 176.

Crystal oscillator 162 generates a signal at 2 MHz and applies it to a timing chain 160 which reduces the signal to various frequencies. One such frequency is 4 KHz which is applied to driver 164 through lead 163 to drive the ultraviolet tube 54 through the ultraviolet tube inverter 168.

Another such frequency developed by the timing chain is 56 Hz which is applied through lead 168 to a phase shifter 170 and is thereafter applied to the motor 60 through scan motor amp 172. The signal to the scanning motor amplifier 172 is phase shifted so that the physical position of the mirror correlates to the scan/retrace signal. That is, when the scan/retrace signal goes from low to high, the mirror starts a right-to-left scan.

The 56 Hz signal applied to the phase shifter 170 is also provided as an output 184 for a scan/retrace signal to the central processing unit. Various signals are applied to a decoder 174 which applies a synchronization pulse to the sample-and-hold circuit 156 through the lead 176. The sync pulse is timed to catch the peak of the signal in the sample-and-hold circuit. Further, the decoder 174 applies start conversion signals and interrupt signals to the CPU through outputs 178 and 180 respectively. Further, the decoder 174 applies a clock pulse to the CPU 74 for analog-to-digital conversion through output 182.

Figure 7:
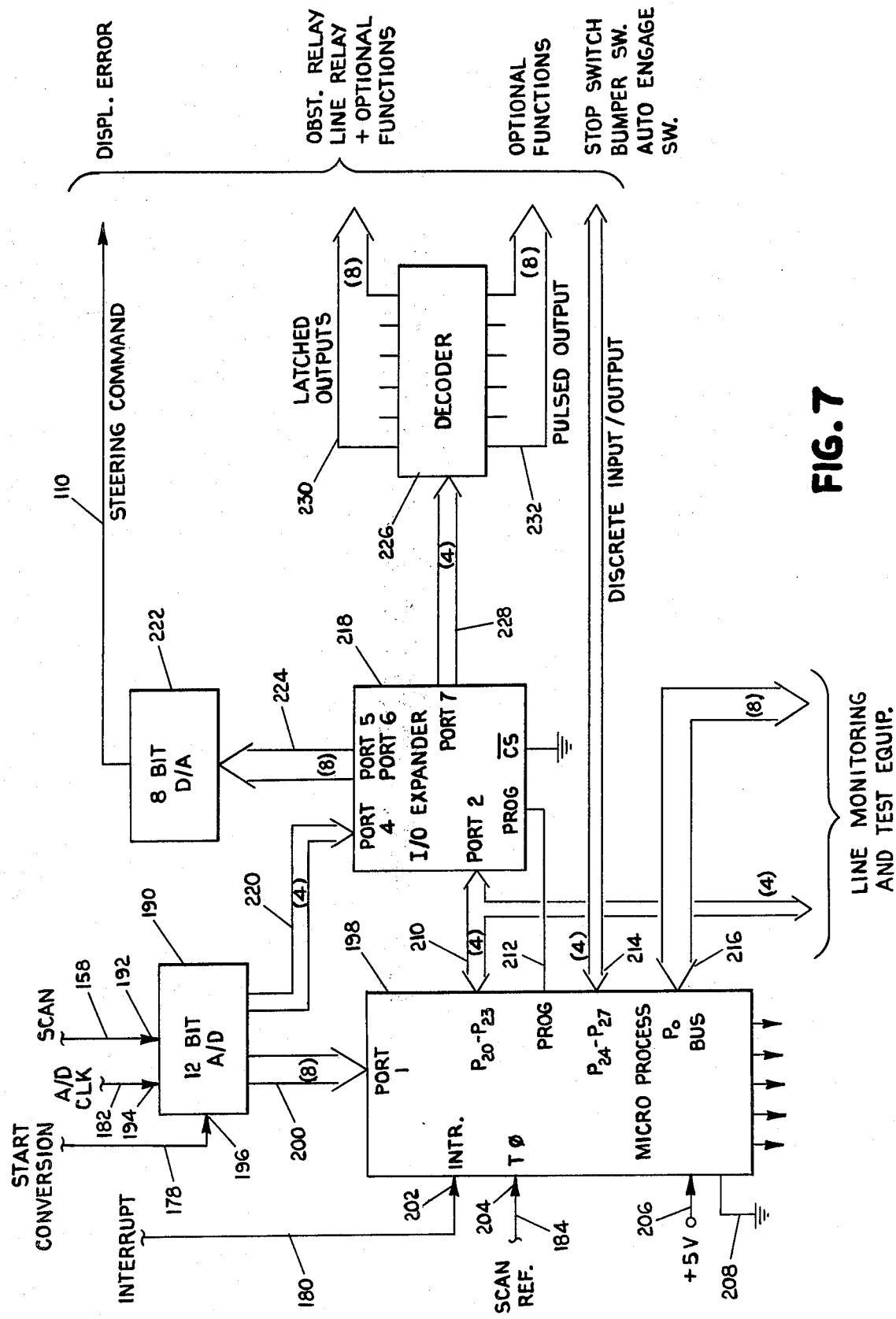
FIG. 7 is a schematic diagram of the central processing unit illustrated in block form in FIG. 5.

Reference is now made to FIG. 7 for a description of the central processing unit 74. The central processing unit 74 comprises a 12-bit analog-to-digital converter 190 having a scan input terminal 192, an analog/digital clock input 194 and a start conversion input 196. A microprocessor 198 is connected to the analog-to-digital converter 190 through an 8-bit lead connection 200. The microprocessor 198 further has inputs 202 for an interrupt signal and 204 for a scan reference signal. A 5-volt input 206 and a ground input 208 are also provided as is conventional in the art.

An input/output expander 218 is connected to the analog-to-digital converter 190 through a 4-bit lead connection 220 and is connected to the microprocessor 198 through 4-bit input/output leads 210 and through a program lead 212. The microprocessor 198 further has 4-bit input/output leads 214 and 8-bit input/output leads 216.

An 8-bit digital-to-analog converter 222 is connected to the input-output expander 218 through 8-bit lead 224. The output of the digital-to-analog converter 222 is connected to the steering command lead 110. A decoder 226 having eight latched outputs 230 and eight pulsed outputs 232 is connected to the input/output expander 218 through 4-bit leads 228.

The scan input 192 to the converter 190 is connected to the sample-and-hold output 158. The clock input 194 to the converter 190 is connected to the clock output 182 of decoder 174. The start conversion input 196 of converter 190 is connected to the start conversion output 178 of decoder 174. The interrupt input 202 to the microprocessor 198 is connected to the interrupt output 180 from decoder 174. The scan reference input 204 to the microprocessor 198 is connected to the scan retrace output 184 from the timing chain 160.

Figure 8:
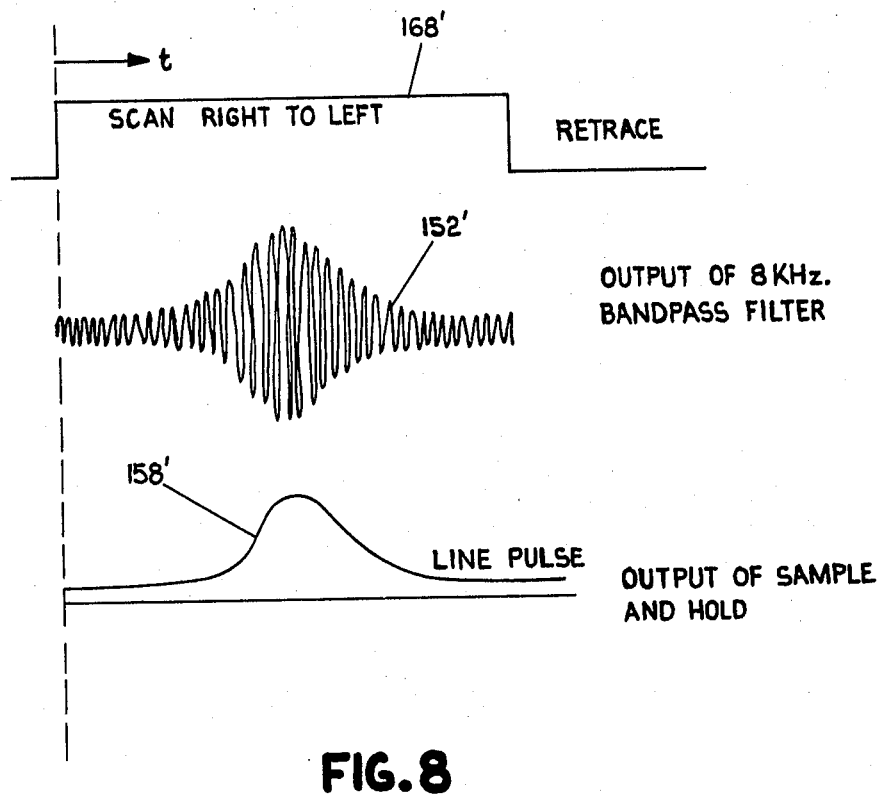
FIG. 8 is a diagrammatic representation of the wave form output of three circuits in the scanning head as a function of time for a single scan.

The operation of the central processing unit will now be described with reference to FIGS. 7 through 17. As shown in FIG. 7, the scan signal 158 is applied to the 12-bit analog-to-digital converter 190. The signal is in the form illustrated in the bottom graph of FIG. 8. In FIG. 8, the signal applied to the scanning motor 60 is illustrated as line 168' in the top of FIG. 8. The output from the band pass filter 152 is illustrated as graph 152'. The output from the sample-and-hold circuit 156 is illustrated as line 158' in the bottom graph of FIG. 8. This signal is applied to the analog-to-digital converter 190 through scan input 192 and is converted into a 12-bit digital signal. The conversion is made 33 times for each scan in a manner illustrated in FIG. 10.

Figure 10:
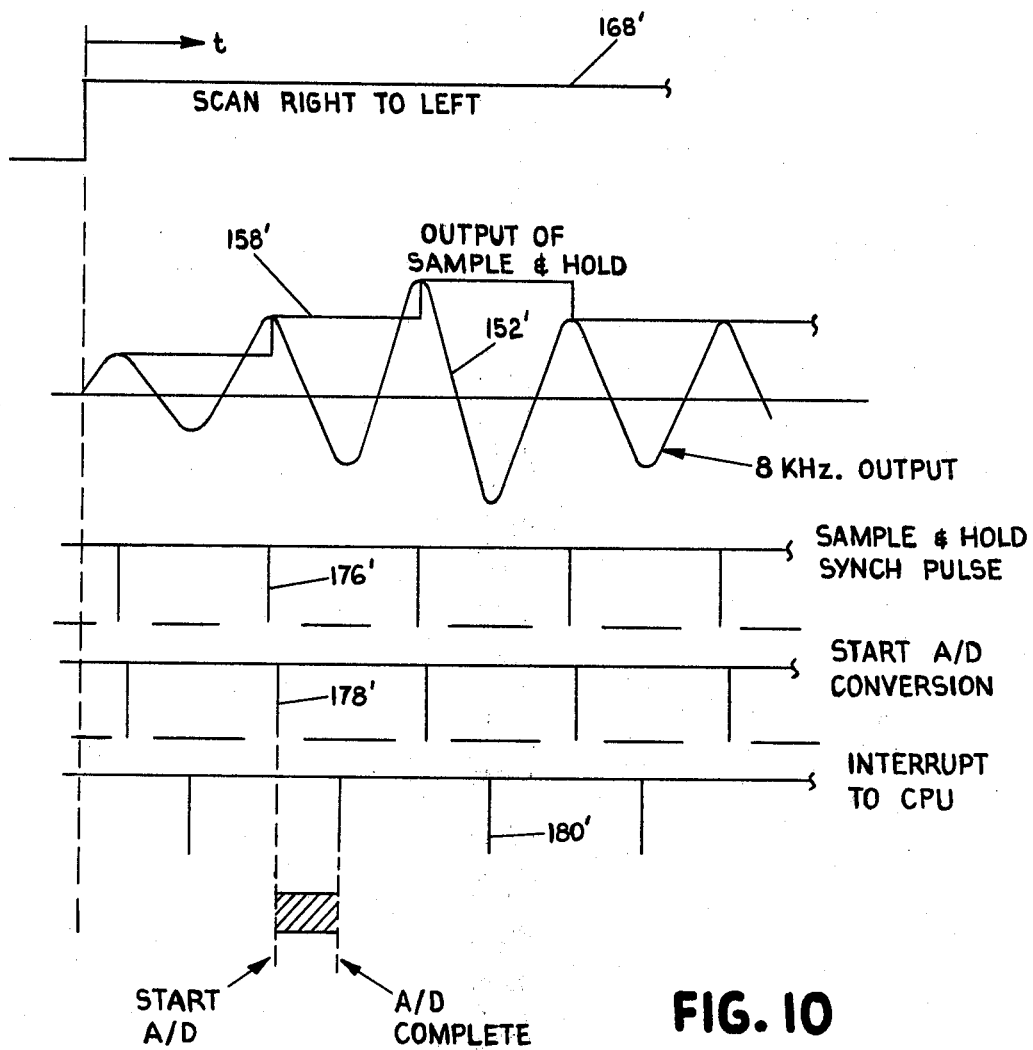
FIG. 10 is an expanded schematic representation of a scanning head output signal as a function of time for a portion of one scan.
Figure 11:
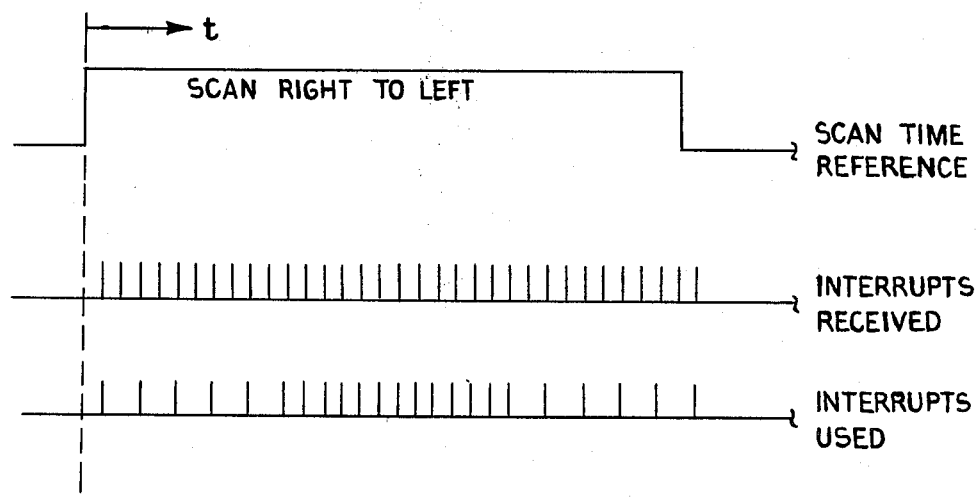
FIG. 11 is a schematic representation of the relationship between the scan, the interrupt received by the microprocessor and the interrupts used by the microprocessor as a function of time.

In FIG. 10, a small portion of the scan is illustrated as a function of time. The left-to-right scan is illustrated as signal 168' at the top of FIG. 10. The band pass output signal is illustrated as signal 152' in the second-from-the-top graph. The sync pulses which are applied to the sample-and-hold circuit 156 are illustrated as lines 176' in the third graph from the top. The output from the sample-and-hold circuit 156 is illustrated as the curve 158' in the second-from-the-top graph in FIG. 10. The start conversion pulse applied to the converter 190 through input 196 is illustrated as the lines 178' in the fourth-from-the-top curve in FIG. 10. Note that the lines 178' are displaced slightly later in time than the sync pulse 176'. Also note that the sample-and-hold sync pulse 176' is coincidental with the peak of the band pass filter output signal 152'. The interrupt signal is illustrated as lines 180' in the bottom graph shown in FIG. 10. The interrupt signals 180' occur at a period of time subsequent to the start conversion pulses 178'. The length of time delay between the interrupt signals 180' and the start conversion signal 178' is sufficient to permit the analog-to-digital conversion to take place in the converter 190 prior to the initiation of a second sync pulse 176'.

Figure 9:
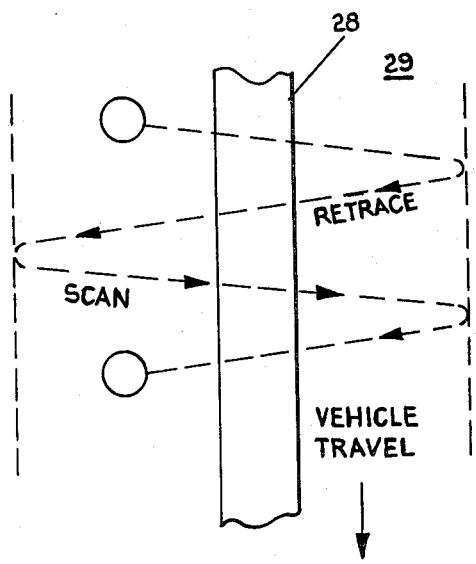
FIG. 9 is a schematic representation of a trace of a scanning head across the floor area beneath the vehicle.

The digital information converted by the converter 190 is applied in 12-bit form to the microprocessor 198. This information is received at discrete intervals during the entire scan cycle, beginning with the intitiation of the scan cycle. Thus, the input from the scan reference signal in line 184 initiates the reception of the data from the converter 190. When an interrupt signal 180' is applied through input 202 to the microprocessor 198, the information is read by the processor and stored in a memory. This process takes place 33 times during each scan cycle. However, five such groups of information are ignored at each end of the scan cycle in order to compensate for the nonlinear sweep of the scanner. The trace of the scan spot on the floor is illustrated in FIG. 9. Because the trace slows down at the ends of the trace, the output of the photodiode is a sine function. Therefore, five signals at the end of each scan are ignored. Further, the reading of the scan signal takes place only during the scanning from one side to the other, for example right to left, and is not read during retrace, i.e. left to right.

Thus, the process of reading and storing data points continues until 23 specific data points are stored in the microprocessor data memory. This information is called the "scan data table." After all 23 data points have been entered, the scan is considered to be complete by the microprocessor and a light compensation routine then occurs. The data points are acted on by the microprocessor through a program which compensates for nonuniform tube output, changing scan distance and limited light port size. The nonuniform tube output is characteristic of the U-shaped, fluorescent ultraviolet tube 54. The output intensity of the tube is greater at the bright portion than at the ends thereof. Therefore, the light available and viewed by the photodiode will be greater at the right hand portion of the scan than at the left hand portion thereof. Further, as the scan distance changes from the center point of the scan, the light intensity as viewed by the photodiode decreases due to the changing distance between the photodiode and the floor surface. Thus, the light intensity is greater at the center of the scan than at the sides thereof.

Figure 12:
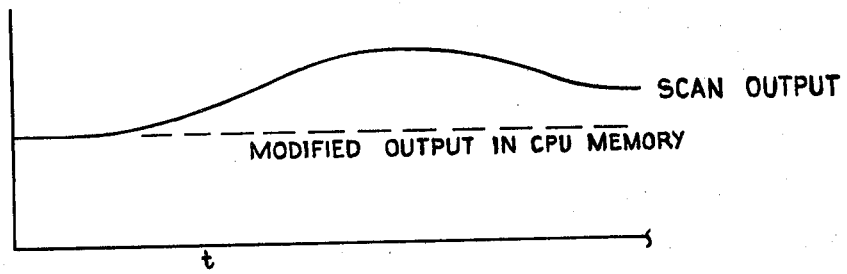
FIG. 12 is a graphic representation of the scan output signal as a function of time and the modified output which results from the program in the central processing unit.

The light port as viewed by the scanning head has greater illumination at the center thereof than at the edges due to the fact that the central portion of the scanning spot is illuminated from both sides of the fluorescent tubes whereas the edges are illuminated more by one side of the tube than by the other. The effect of these irregularities is illustrated in FIG. 12. The solid line curve shown in FIG. 12 illustrates a scan output for a no-line condition. Note that the scan output rises and then falls to a level above the initial value. However, the true output should be that illustrated in the straight dotted curve shown in FIG. 12. Thus, through emperical data, such as illustrated in FIG. 12, a program is loaded into the microprocessor 198 and the program acts on the data in the scan data table to compensate for the irregularities due to nonuniform tube output, changing scan distance and limited light port size. This step is illustrated in the "light compensation" step shown in FIG. 13.

Subsequent to the light compensation step, the microprocessor then performs a dynamic range check on the data in the scan data table. Twelve binary bits are required to cover the dynamic range of the scanning output but only eight binary bits are used by microprocessor 198. The eight binary bits provided adequate signal accuracy for steering output to the vehicle. However, in the event that the wrong range of bit information is collected, i.e. there is an overflow or the peak value entered is insufficient, then the data in the scan data table cannot be used. In such event, the range is changed, either by lowering the range or raising the range, depending on the problem sensed in the dynamic range check, and the process begins anew for another scan.

Subsequent to a successful dynamic range check, the background radiation is removed from the signal. The curve 158' shown in FIG. 8 shows a slight background bias above the zero point. This results from the fluorescence in the floor or carpet on which the line is placed. The background bias is determined as the lowest point in the data table and a program to remove the same is executed by the microprocessor 198.

Figure 14:
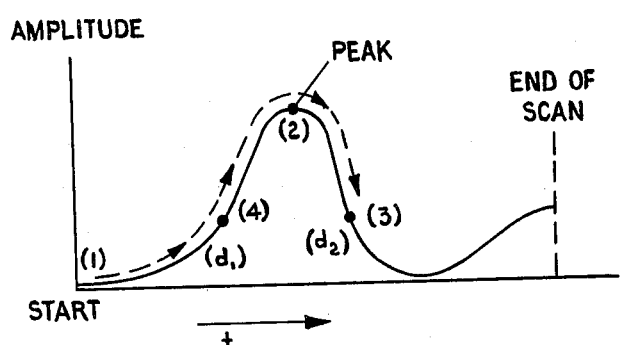
FIGS. 14 and 15 are graphic illustrations of a trace stored in the scan data table and illustrating the techniques by which the peak of the curve is located.
Figure 15:
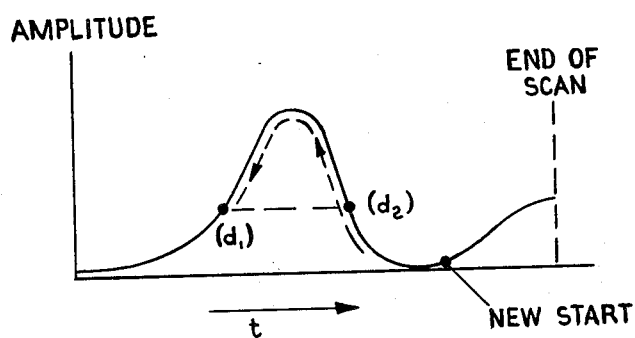

The next step in the microprocessor operation is the "find-line" function. This function is illustrated in FIGS. 14 and 15. The microprocessor examines the values in the scan data table. It begins at a start position (1) and continues until a peak (2) is found. Thereafter, the search continues until there is found a value at (3) of less than 50% of the peak value, i.e. ½ of (2). This data point is called $d_2$ (for distance 2). The search then reverses until less than 50% of the peak is found on the other side of the curve (4). This point is called $d_1$. With $d_1$ and $d_2$ known, the center line of the line detected by the scanning head can be determined by computing one-half of the sum of $d_1$ plus $d_2$. Further, points $d_1$ and $d_2$ can be considered to be the respective right- and left-hand edges of the line.

Once $d_1$ and $d_2$ are found, then these values are compared to a previously detected $d_1$ and $d_2$ values from a previous scan. In the first scan which the machine follows, the $d_1$ and $d_2$ values are simply stored in the memory for comparison with future scans. Otherwise, the $d_1$ and $d_2$ values are both checked for compliance with a previous scan. This process is the "line fit" step illustrated in FIG. 13. If either $d_1$ of $d_2$ is displaced by more than one-half inch from a previous $d_1$ or $d_2$ value, the line is rejected and the search process continues throughout the entire scan until such time as a line fits, that is, $d_1$ and $d_2$ are both within one-half inch of the $d_1$ and $d_2$ values for the previous scan. If no fit is found or three nonfitting lines are found in a given scan, then the previous information is used and the process starts again with a new scan. Thus, at the end of three attempts to find the line or at the end of the data table, the processor checks to see whether valid line conditions have been met, i.e. if no line fit is found in three times or the end of the table is reached, then the processor indicates "no line" and the process starts again. ("Tried three times or end of table" in FIG. 13). The microprocessor keeps track of the number of consecutive scans in which no line fit is found. If, after a predetermined number of consecutive scans, i.e. 10 to 15 scans, no line fit is found, then the process determines that a valid line is not present and applies an output signal through leads 214 to a stop switch.

On the other hand, if a line fit is found, the $d_1$ and $d_2$ values are adjusted in the memory and the new $d_1$ and $d_2$ figures become the new line position. The new line position is then compared with the predetermined position at which the line is supposed to be positioned and accordingly writes an error signal which is applied to the servopower amplifier 46 through input/output expander 218 and digital-to-analog converter 222.

Figure 16:
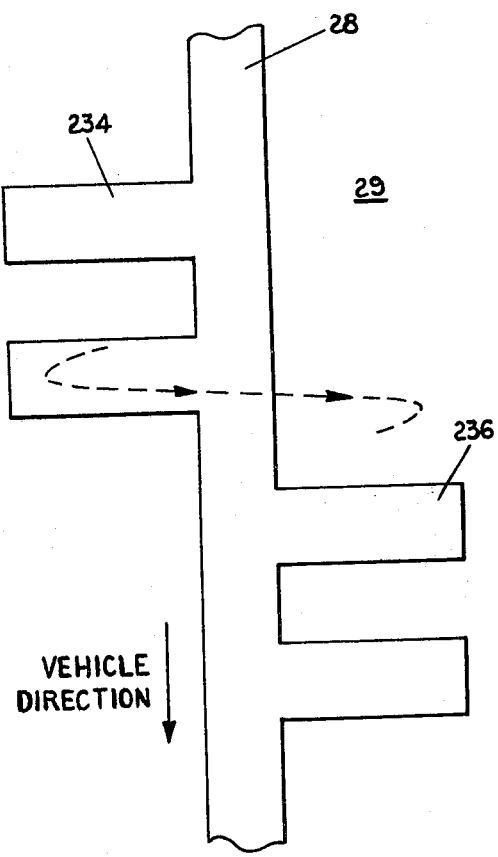
FIG. 16 is a schematic illustration of a guide path with a code marking and illustrating in phantom lines the trace of the scanning head across the guide path and code marking.

At the time the error signal is written, the processor 198 checks to see whether a code is present or has been detected by the scanning head. A code is illustrated in FIG. 16 to which reference is now made. Code is written on the floor 29 by a series of spikes perpendicular to the guide line. Spikes 234 on the right side of the guide line (as viewed from the vehicle) can represent "1" code marks and spikes 236 on the left side of the guide line can represent "0" code marks. The trace of the scanning head is shown in phantom line in FIG. 16 as it scans from one of the "1" code marks 234 to the other side of the line. Note that the scan commences well within the code mark and ends on the floor pattern adjacent the line.

Figure 17:
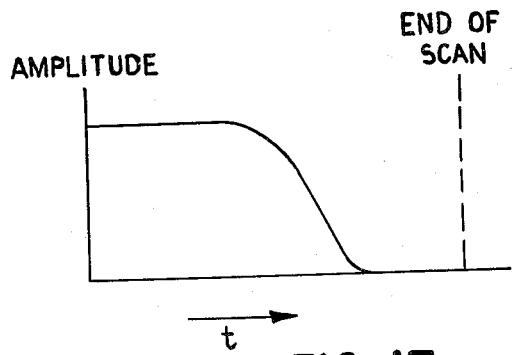
FIG. 17 is a graphic representation of the photodiode output resulting from the scan illustrated by the phantom line in FIG. 16.
Figure 13:
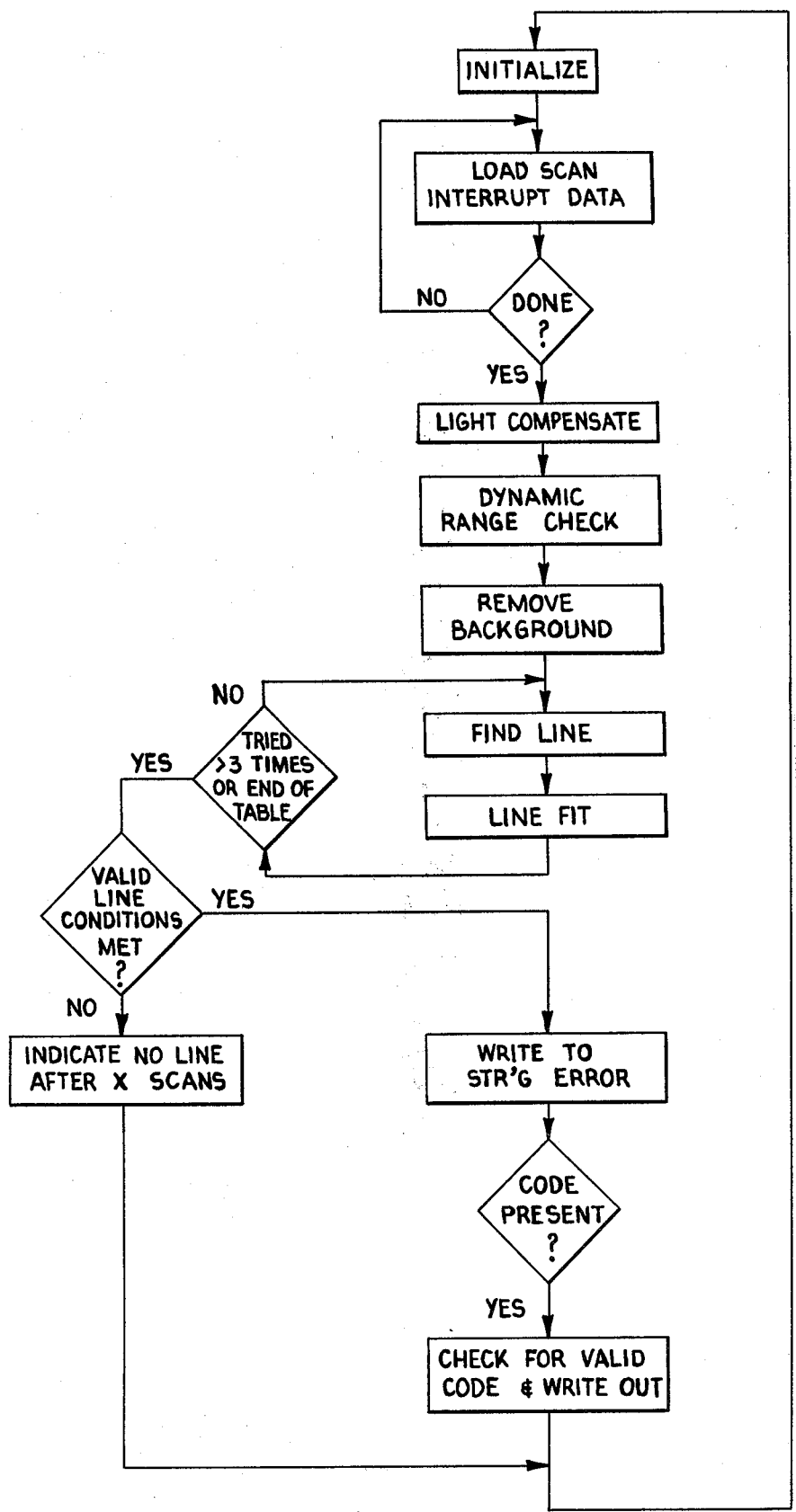
FIG. 13 is a block flow diagram of the central processing unit software.

The output of the photodiode for the scan illustrated in FIG. 16 is shown in FIG. 17. Note that the amplitude is high at the initial part of the scan and tapers off to 0 at the end of the scan.

Thus, when this data is present in the microprocessor, the microprocessor reads such a scan as a code. However, in order for the code to be considered valid, there must be at least two consecutive scans and not more than eight scans of identical nature, i.e. no $d_1$, or no $d_2$, in order for a valid code to be found. If a valid code is detected, then the code is accumulated until four such code marks are accumulated. Based on the four codes, the microprocessor will compare those codes with a program in the microprocessor and, in response thereto, will execute a code command. If the code indicates that the vehicle should follow a right or left branch of a Y, then the microprocessor will execute a steering command to the servopower amplifier 46 through line 110, converter 222 and expander 218 to cause the scanning head to follow either the left edge or the right edge of the line. Other functions which can be performed by the vehicle responsive to codes include permanent stops, elevator call, temporary stops, obstacle relay disengage, these commands are applied to various switches through the decoder 226 and expander 218. In this connection, latched outputs 230 or pulsed outputs 232 are utilized depending on the ultimate function.

The invention thus provides a system for following a detectable line on the floor, preferably a visible fluorescent line, while reading codes and executing command functions based on floor codes. As stated above, alternately, the microprocessor could be programmed with a more complex program which instructs the vehicle to proceed to some predetermined point. However, in simplest form, the invention contemplates a simple steering control or immediate response by the vehicle to code marks.

Reasonable variation and modification are possible within the scope of the foregoing disclosure and drawings without departing from the spirit of the invention which is defined in the appended claims.

The embodiments of the invention in which an exclusive property or privilege is claimed are defined as follows:

1. In a system for automatically guiding a vehicle wherein a guide line having a finite width is positioned in a predetermined path on the floor and wherein a vehicle has means to sense the position of the guide line with respect to the vehicle; means for generating an intelligence signal representative of the position of the vehicle with respect to the guide line; and control means to steer the vehicle responsive to the intelligence signal generated by the sensor means so as to maintain a given position of the vehicle with respect to the guide line as the vehicle moves therealong, the improvement in the sensing means which comprises:

means to sequentially scan across the guide line and for generating an output signal having first, second and third components and representative of sequentially detected light values at discreet positions in the scan; and the intelligence signal generating means, being coupled to the scanning means, includes means for detecting the position of the vehicle with respect to the guide line based on the output signal wherein the first and second components are of substantially equal values and in a time sequence with a third component of substantially unequal value therebetween.

2. A guidance system according to claim 1 wherein the detecting means further comprises means for detecting the position of the vehicle with respect to right and left edges of the guide line.

3. A system according to claim 2 wherein the intelligence signal is representative of the position of the vehicle with respect to the left or right edge of the guide line.

4. A system according to claim 1 wherein the guide line comprises a fluorescent material which is invisible under ordinary lighting conditions.

5. A system according to claim 1 wherein the sensing means comprises means for electronically removing background radiation from the output signal representative of the detected light values at discreet positions in the scan.

6. A system according to claim 1 and further comprising a light source carried by the vehicle for illuminating a floor surface beneath the sensing head and means for compensating the output signal for any nonlinearity of the light source on the floor surface.

7. A system according to claim 1 and further comprising means for compensating the output signal for variations in the scan distance from the scanning means to a floor surface beneath the vehicle.

8. A system according to claim 1 wherein the scanning means includes a light port, a light detector aligned with the port and means to focus the light detector onto a floor surface beneath the vehicle, and the means for detecting the position of the vehicle further comprises means for compensating the output signal for variation in the light values due to the limited size of the light port.

9. A system according to claim 8 and further comprising a light source carried by the vehicle for illuminating the floor surface beneath the means to sense the position of the guide line and means for compensating the output signal for any nonlinearity of the light source on the floor surface; and means for compensating the output signal for variations in the scan distance from the scanning means to the floor surface beneath the vehicle.

10. A system according to claim 1 wherein the detecting means inclues data storage means; means for storing in the data storing means a first data table relating to the position of the vehicle with respect to the guide line for a first scan; means for comparing a second data table relating to the position of the vehicle with respect to the guide line for a subsequent scan with the first data table; and means for updating the data stored in the data storage means with the second data table in the event that the guide line positioned in the second data table is within a predetermined relationship to the guide line positioned in the first data table.

11. A system according to claim 10 wherein the detecting means further comprises means for establishing the left and right edges of the guide line with respect to the vehicle within the first and second data tables.

12. A system according to claim 10 and further comprising means for stopping the vehicle in the event that any guide line found in the data tables in a predetermined number of consecutive scans is not within a predetermined relationship with respect to the guide line position of the first data table.

13. The system according to claim 1 wherein the guide line has code marks and further comprising means in the vehicle for determining the presence of the code marks; and means for guiding the vehicle based on the detected code marks.

* * * * *